United States Patent

Shiba et al.

[11] 3,977,882
[45] Aug. 31, 1976

[54] SPECTRALLY SENSITIZED SILVER HALIDE PHOTOGRAPHIC EMULSION

[75] Inventors: Keisuke Shiba; Akira Sato, both of Minami-ashigara, Japan

[73] Assignee: Fuji Photo Film Co., Ltd., Minami-ashigara, Japan

[22] Filed: July 17, 1975

[21] Appl. No.: 596,921

Related U.S. Application Data

[63] Continuation-in-part of Ser. No. 381,137, July 20, 1973, Pat. No. 3,922,170.

[30] Foreign Application Priority Data

July 20, 1972 Japan.............................. 47-72735

[52] U.S. Cl................................. 96/124; 96/100; 96/137
[51] Int. Cl.²........................................... G03C 1/14
[58] Field of Search....................... 96/124, 137, 100

[56] References Cited
UNITED STATES PATENTS

| | | | |
|---|---|---|---|
| 3,338,714 | 8/1967 | Ficken et al. | 96/124 |
| 3,463,640 | 8/1969 | Ficken et al. | 96/124 |
| 3,615,609 | 10/1971 | Fry et al. | 96/124 |
| 3,679,428 | 7/1972 | Shiba et al. | 96/124 |
| 3,922,170 | 11/1975 | Shiba et al. | 96/124 |

*Primary Examiner*—J. Travis Brown
*Attorney, Agent, or Firm*—Sughrue, Rothwell, Mion, Zinn & Macpeak

[57] ABSTRACT

A silver halide photographic emulsion which is spectrally sensitized so that it has a maximum sensitivity wave length within the region of 580–640 nm, characterized by containing in a super sensitizing amount the combination of at least one carbocyanine dye represented by the general formula (I) and at least one of the dyes selected from the group consisting of dyes represented by the general formula (II):

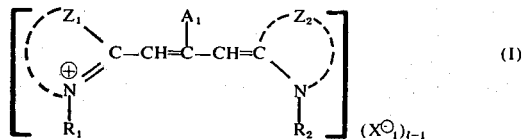

wherein $Z_1$ represents the grouping necessary for the formation of $\beta$-naphthothiazole or $\beta$-naphthoselenazole ring, $Z_2$ represents the grouping necessary for the formation of benzoxazole ring, $A_1$ represents a hydrogen atom, an alkyl radical or an aryl radical, $R_1$ represents an alkyl group and $R_2$ represents a hydroxyalkyl group, a carboxyalkyl group or an alkyl group substituted with a sulfo group, $X_1$ represents an acid anion group, an $l$ is 1 or 2, the dye forming an intramolecular salt when $l$ is 1:

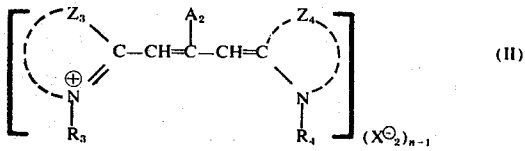

wherein $Z_3$ and $Z_4$ each represents the grouping necessary for the formation of a benzothiazole, benzoselenazole, $\beta$-naphthothiazole or $\beta$-naphthoselenazole ring, $A_2$ represents a hydrogen atom, an alkyl radical having less than three carbon atoms or an aryl radical, $R_3$ and $R_4$ each represents an alkyl radical, at least one of which represents a hydroxyalkyl radical, a carboxyalkyl radical or an alkyl radical having a sulfo group, $X_2$ represents an acid anion group, and $m$ is 1 or 2, the dye forming an intramolecular salt when $m$ is 1.

9 Claims, 13 Drawing Figures

400  440  480  520  560  600  640  680  720
WAVELENGTH (mμ)

SPECTRALLY SENSITIZED SILVER HALIDE PHOTOGRAPHIC EMULSION

CROSS-REFERENCE TO RELATED APPLICATION

This application is a continuation-in-part application of Ser. No. 381,137, filed July 20, 1973, entitled "SPECTRALLY SENSITIZED SILVER HALIDE EMULSION" by Keisuke Shiba et al., now U.S. Pat. No. 3,922,170.

BACKGROUND OF THE INVENTION

1. Field of the Invention

The present invention relates to a silver halide photographic emulsion in which a specific wave length range is highly spectrally sensitized by a supersensitization, more especially, the present invention relates to a silver halide photographic emulsion in which the wave length range from 580 to 640 nm is spectrally sensitized.

2. Description of the Prior Art

An appropriate spectral sensitivity distribution over the visible wave length range to which human eyes are sensitive is given to conventional photographic sensitive materials. An appropriate spectral sensitivity distribution is required for suitable color reproduction. Usually, a combination of two or more sensitizing dyes is selected, the combination having a supersensitization effect.

To obtain excellent color reproduction, it is not preferred to have high sensitivity at too long a wave length, e.g. a wave length longer than 660 nm (the wave length at the maximum sensitization) or to have high sensitivity only at too short a wave length region, e.g., shorter than 580 nm (the wave length at the maximum sensitization). It is difficult to selectively increase sensitivity within the wave length region from 580 to 640 nm, and the solution to this problem is an important matter in this technical field.

U.S. Pat. No. 3,338,714 Ficken et al. discloses dye combinations. However, in Dye II of Ficken et al., the N-substituent $R_{12}$ on the benzoxazole nucleus is defined as an alkyl group and the N-substituent $R_{14}$ on the benzothiazole, benzoselenazole, naphthothiazole or naphthoselenazole nucleus is defined as a group A—Q wherein A is an alkylene chain, and Q is an amide, carboxylic acid or sulfonic acid. The N-substituent ($R_2$) of the benzoxazole nucleus ($Z_2$) of the present invention represents a hydroxyalkyl group, a carboxyalkyl group or an alkyl group having a sulfo group, and the N-substituent ($R_1$) on the β-naphthothiazole or β-naphthoselenazole ($Z_1$) nucleus represents an unsubstituted alkyl group or a substituted alkyl group, preferably an unsubstituted alkyl group or an alkoxyalkyl group.

The emulsions disclosed in U.S. Pat. No. 3,463,640 Ficken et al. comprise a dye of the formula (III) having a benzoxazole nucleus, together with either (a) two dyes of formula (I) or (b) a combination of a dye of the formula (I) and a dye of the formula (II) as essential components, i.e., the emulsion must contain a combination of three dyes. On the contrary, the emulsion of the invention comprises a combination of two dyes and does not necessarily comprise three dyes. Further, the carbocyanine dye having a benzoxazole nucleus used in the present invention contains, as an essential moiety, a β-naphthothiazole (or β-naphthoselenazole) nucleus, whereas dye (III) of the Ficken et al reference contains a benzothiazole (or benzoselenazole) nucleus and does not contain a β-naphthothiazole or β-naphthoselenazole) nucleus.

The present invention uses a carbocyanine dye having a benzoxazole nucleus as Dye I, whereas U.S. Pat. No. 3,679,428 Shiba et al uses a carbocyanine dye having a naphthoxazole nucleus. The dyes of Shiba et al show inferior color staining.

SUMMARY OF THE INVENTION

Accordingly, a first object of the present invention is to provide a new supersensitization technique to selectively increase the sensitivity within the wave length region from about 580 to 640 nm.

Another object of the present invention is to diminish the color residue or stain which typically remains after development.

Moreover, a further object of the present invention is to provide a sensitizing dye that does not diffuse into and sensitize adjacent sensitive layers when a layer of a multi-layer sensitive material is selectively spectrally sensitized.

The above objects are attained as follows:

To a photographic emulsion there is added the combination of at least one carbocyanine dye of general formula (I) and at least one dye of general formula (II), in an amount sufficient to provide a supersensitization:

wherein $Z_1$ represents the grouping necessary for the formation of a β-naphthothiazole or β-naphthoselenazole ring, $Z_2$ represents the grouping necessary for the formation of a benzoxazole ring, $A_1$ represents hydrogen atom, an alkyl group, (e.g., an unsubstituted alkyl group having up to 4 carbon atoms or a monoaralkyl group wherein the alkyl moiety has up to 4 carbon atoms) or monoaryl (i.e., unsubstituted or substituted monoaryl) radical, $R_1$ represents an alkyl (i.e., an unsubstituted alkyl group preferably having up to 8 carbon atoms and a substituted alkyl group wherein the alkyl moiety preferably has up to 4 carbon atoms, most preferably an alkoxyalkyl group) radical, a hydroxyalkyl, carboxyalkyl or an alkyl radical having a sulfo group, $R_2$ represents a hydroxyalkyl, a carboxyalkyl or an alkyl group substituted with a sulfo group which any of such radicals contain up to 4 carbon atoms in the alky moiety, $X_1$ is an acid anion group, and $l$ is 1 or 2, being 1 when the dye forms an intramolecular salt (similar to a betaine structure).

wherein $Z_3$ and $Z_4$ each represents the grouping necessary for the formation of a benzothiazole, benzoselenazole, β-naphthothiazole or β-naphthoselenazole ring, $A_2$ represents a hydrogen atom, an alkyl radical having less than three carbon atoms or a monoaryl radical (i.e., unsubstituted or substituted monoaryl), $R_3$ and $R_4$ each represents an alkyl (i.e. an unsubstituted alkyl group preferably having up to 8 carbon atoms and a substituted alkyl group wherein the alkyl moiety preferably has up to 4 carbon atoms) radical, at least one of which is a hydroxylalkyl, carboxyalkyl or alkyl radical having a sulfo group, $X_2$ is an acid anion group, and $m$ is 1 or 2, being 1 when the dye forms an intramolecular salt (similar to a betaine structure).

DETAILED DESCRIPTION OF THE INVENTION

In the general formulae (I) and (II) the hetero ring formed by $Z_2$ to $Z_4$ can be substituted with at least one substituent which does not deteriorate the sensitivity, such as an alkyl group, preferably having up to 4 carbon atoms (e.g. a methyl group, a trifluoromethyl group), a halogen atom (e.g. a fluorine atom, a chlorine atom, a bromine atom), a monoaryl group (e.g. a phenyl group, a tolyl group), an alkoxy group, preferably having up to 4 carbon atoms (e.g. a methoxy group), a hydroxy group, an alkoxycarbonyl group wherein the alkyl moiety preferably has up to 4 carbon atoms (e.g. a methoxy carboxyl group, an ethoxy carbonyl group), a cyano group, an amino group (e.g. an amino group, a dimethyl amino group), an aminocarboxyl group (e.g. a dimethyl amino carboxyl group) a monoaryloxy group (e.g. a phenoxy group), and an acyl group (i.e. an aromatic or alliphatic acyl group such as an acetyl group).

In general formulae (I) and (II), which represent the sensitizing dyes used in this invention, specific examples of the hetero rings formed by $Z_2$ are benzoxazole, 5-methyl benzoxazole, 5,6-dimethyl benzoxazole, 5-chlorobenzoxazole, 5-chloro-6-methyl benzoxazole, 5-bromobenzoxazole, 5-phenyl benzoxazole, 5-tolyl benzoxazole, 5-methoxy benzoxazole, 5-hydroxy benzoxazole, 5-methoxycarbonyl benzoxazole, 5-ethoxycarbonyl benzoxazole, 5-trifluoromethyl benzoxazole, 5-cyanobenzoxazole, 5-aminobenzoxazole, 5-phenoxybenzoxazole, 5-acetyl benzoxazole and the like. $A_1$ and and $A_2$ each represents, for example, a hydrogen atom, methyl, ethyl, propyl, phenethyl or phenyl radical. $R_1$, $R_3$ and $R_4$ each represents, for example, methyl, ethyl, propyl, allyl, hydroxyalkyl (e.g., 2-hydroxyethyl, 3-hydroxypropyl etc.), carboxyalkyl (e.g., 2-carboxyethyl, 4-carboxybutyl, 3-carboxypropyl, etc.) alkoxyalkyl (e.g. 2-methoxyethyl, etc.), an alkyl having a sulfo group (e.g., 3-sulfopropyl, 3-sulfobutyl, 2-(3-sulfopropoxy)ethyl, 2-hydroxy-3-sulfopropyl, 3-sulfopropoxyethoxyethyl, etc.), halogenoalkyl (e.g., 2-bromoethyl etc.), sulfoaralkyl (e.g., p-sulfophenethyl, etc.) and the like, wherein $R_2$ represents a hydroxyalkyl, a carboxyalkyl or an alkyl group substituted with a sulfo group as described above for $R_1$, $R_3$ and $R_4$. $X_1$ and $X_2$ represent, for example, aromatic or mineral acid anions which are commonly used to form cyanine dye salts, such as iodine, bromine, chlorine, p-toluene sulfonic acid, benzene sulfonic acid, ethyl sulfate, perchlorate, rhodan ions and the like. $Z_3$ and $Z_4$ each represents, for example, a benzothiazole, 5-chlorobenzothiazole, 5-fluorobenzothiazole, 5-bromo-6-methyl benzothiazole, 5-cyanobenzothiazole, 5-cyano-6-chlorobenzothiazole, 5-methyl benzothiazole, 7-dimethylaminobenzothiazole, 5-phenyl benzothiazole, 5-p-methoxyphenyl benzothiazole, 5-phenoxybenzothiazole, 5-trifluoromethylbenzothiazole, 5-dimethylaminocarbonylbenzothiazole, 5-methoxycarbonylbenzothiazole, 5-hydroxybenzothiazole, benzoselenazole and 5-methylbenzoselenazole ring and the like, as well as β-naphthothiazole or β-naphthoselenazole rings as described in British Pat. No. 1,137,083. While the heterocyclic rings and the substituent at the nitrogen atom of the heterocyclic ring importantly should be selected as described above, the substituents which can be present on the benzene nucleus of the heterocyclic ring are of lesser importance and generally can be freely selected by one skilled in the art.

Characteristically, the sensitizing dyes represented by general formula (I) are asymmetric benzoxacarbocyanine dyes having a hydroxyalkyl, carboxyalkyl or alkyl radical with a sulfo group at the nitrogen atom in the nitrogen-containing heterocyclic nucleus, the dyes readily forming a J-aggregate having an absorption band the wave length region from 580 to 625 nm. Further, they can be used in combination with one or more dyes represented by general formula (II) to increase spectral sensitivity without shifting the maximum sensitivity toward wave lengths longer than 640 nm.

In the sensitizing dyes represented by the general formula (II), the substituent bound to the nitrogen atom in one (preferably both) nitrogen-containing heterocyclic nuclei is/are hydroxyalkyl, carboxyalkyl or an alkyl radical having a sulfo group, whereby they provide high red sensitivity at an amount where the maximum sensitivity is not shifted toward too long wave length, and there results little color stain after development even if a large amount of the dye is used.

The super sensitization effect obtained by the combination of dyes according to this invention is not disturbed by color couplers incorporated in an emulsion. For example, the combination of dyes according to this invention does not increase fog and can be used in a photosensitive emulsion layer of a multi-layer emulsion without diffusion of the dyes to adjacent emulsion layers to sensitize the same (silver halide).

The supersensitization according to this invention can be used not only for orthopanchromatic sensitive emulsions, multi-layer inner type color sensitive emulsions but especially for reversal or negative color emulsion.

Examples of the sensitizing dyes used in this invention are given below, but the dyes are not restricted thereto:

(IA)

(IB)

(ID)

(IE)

(IF)

(IG)

(IIA)

(IIB)

(IIC)

(IID)

(IIE)

(IIF)

(IIG)

(IIH)

(II-I)

Control Sensitizing Dyes:

(A)

(B)

(C)

The silver halide photographic emulsion used in this invention can be manufactured by any common manner, e.g., precipitated by the single or double jet method or a combination thereof, and contains aged silver chloride, bromide, iodide or mixed silver halide particles. The preferred silver halides are silver iodobromide (A preferred halogen composition by mole % of iodine is no greater than 10 mol %, for example, from 2 to 7 mol % iodine.) or chloroiodobromide (A preferred halogen composition by mol % of iodine is no greater than 5mol %, for example, from 2 to 3 mol % iodine. The bromine or chlorine composition is optional.). The average diameter of the silver halide particles is not limited but preferably is 0.04 – 2 (arithmetical mean determined by, for example, the projected area method).

The silver halide photographic emulsion used in this invention can be physically and chemically sensitized in a conventional manner, for example, gold sensitized (U.S. Pat. Nos. 2,540,085, 2,597,856, 2,597,915, 2,399,083, etc.); Group VIII metal ion sensitized, sulfur sensitized (U.S. Pat. Nos. 1,574,944, 2,278,947, 2,440,206, 2,410,689, 3,189,458, 3,415,649, etc.), reduction sensitized (U.S. Pat. Nos. 2,518,698, 2,419,974, 2,983,610, etc.) or sensitized by a combination of the methods mentioned above.

The photographic emulsion according to this invention may contain as a chemical sensitizer a sulfur sensitizer such as allyl thiocarbamide, thiourea, sodium thiosulfate and cysteine; a noble metal sensitizer such as potassium chloroaurate, aurous thiosulfate and potassium chloropalladate; a reducing sensitizer such as tin chloride, phenyl hydrazine and reductone, and the like. It may contain other sensitizers such as polyoxyethylene coupounds such as those disclosed in U.S. Pat. No. 2,716,062, polyoxypropylene compounds and compounds having quaternary ammomium group such as those disclosed in U.S. Pat. Nos. 2,271,623; 2,334,864; 2,288,226 and the like. Further, the photographic emulsion may contain anti-fogging agents such as nitrobenzimidazole and ammonium chloroplatinate and stabilizers such as 4-hydroxy-6-methyl-1,3,3a,7-tetrazaindene. The photographic emulsion may also contain hardening agents such as formaldehyde, chrome alum, 1-hydroxy-3,5-dichlorotriazine soda, glyoxal and dichloroacrolein; and coating assistants such as saponin and sodium alkylbenzene sulfonates.

When the silver halide emulsion used in this invention is used for a color light-sensitive material, it may contain color couplers and dispersing agents therefor. Among the color couplers, especially cyan coupler are present. For example, couplers of the phenol series as described in U.S. Pat. No. 2,698,794 or couplers of the naphthol series as described in U.S. Pat. No. 2,474,293 are especially useful.

The silver halide photographic emulsion used in this invention can be based upon protective colloids other than gelatin, for example, gelatin derivatives such as phthalated or malonated gelatin; cellulose derivatives such as hydroxyethyl or carboxymethyl cellulose; soluble starches such as dextrin; hydrophilic polymers such as polyvinyl alcohol, polyvinyl pyrrolidone, polyacrylamide and polystyrene sulfonic acid; plasticizers for dimensional stability; latex polymers and matting agents. The generally used ratio by weight of silver halide to the binder is from about 1 : 4 to 4 : 1.

The finished emulsion is coated on any suitable support, for example, baryta paper, resin-coated paper, synthetic paper, triacetate film, polyethylene terephthalate film, glass plate and other plastic bases.

The sensitizing dyes used in this invention can be added to the emulsion as a solution in water or a water-miscible organic solvent such as methanol, ethanol, methyl cellosolve, pyridine and the like.

The amount of the dyes added is as is commonly used for the supersensitization, e.g. about $5 \times 10^{-3} - 1 \times 10^{-6}$ mol of dye per mol of silver, and the ratio of the dye or dyes of general formula (II) to the dye or dyes of the general formula (I) is preferably about 1:100–1:1 (mol ratio). It is especially preferred that the amount of dye or dyes of general formula (I) be larger than that of the dye of general formula (II) (mol ratio).

The dyes used in this invention can be used for spectral sensitization according to the method described in German Laid-Open Specification No. 2,104,283 and in U.S. Pat. No. 3,649,286.

Specific examples according to this invention are described below, but this invention is not restricted only to the examples. Unless otherwise indicated all parts and percents are by weight.

EXAMPLE 1

Silver halide particles were precipitated in a gelatin binder by the double jet method, physically aged in a common manner, subjected to desalting treatment and chemically aged with 4 ml of an aqueous solution containing hypo and having a concentration of 1 % by weight and 10 ml of an aqueous solution containing potassium chloroaurate and having a concentration of 1 % by weight so that a silver iodobromide (iodine content: 6 mol%) emulsion was manufactured. The emulsion contained 0.6 mol of silver halide/kg of emulsion. The grain size of the silver halide formed was $0.8\mu$. One kg of emulsion was placed in a crucible and dissolved in a constant temperature bath at 50°C.

A given amount of each sensitizing dye of this invention, which was used for the comparison with the sensitizing dyes according to this invention was added to the resulting emulsion as a methanolic solution and stirred at 40°C. On the other hand, a given amount of each dye for comparison was added to the resulting emulsion in the same way as described above. 10 cc of an aqueous 0 : 1 wt.% solution of 4-hydroxy-6-methyl-1,3,3a,7-tetrazaindene, 10 cc of a 1 wt.% aqueous solution of 1-hydroxy-3,5-dichlorotriazine soda and 10 cc of a 1 wt.% aqueous solution of sodium dodecyl benzene sulfonate were added thereto and the system stirred.

The resulting finished emulsion was coated on a cellulose triacetate film base to a dried film thickness of 5 microns, and dried to yield a sample of a sensitive material.

The film sample was cut into strips. One strip was exposed with an optical wedge to a light source provided with a blue filter (SP-1), a yellow filter (SC-50) and a red filter (SC-56) (all by Fuji Photo Film Co., Ltd.) using a sensitometer having a 5,400°K color temperature light source. The remaining strips were exposed to obtain spectrograms using a diffraction grating spectrograph having a 2,666°K tungsten light source.

The exposed strips were developed with a liquid developer having the following composition at 20°C for 2 minutes, stopped, fixed and washed with water to yield strips having a black-and-white image. The densities of these strips were determined by an S-type densitometer (Fuji Photo Film Co., Ltd.) to measure the blue filter sensitivity (Sb), the yellow filter sensitivity (Sy), the red filter sensitivity (Sr) and fog. The base value of optical density for determining sensitivity was (fog + 0.20 ).

supersensitizing effect according to this invention have an excellent effect.

Table 1

Figure 1:
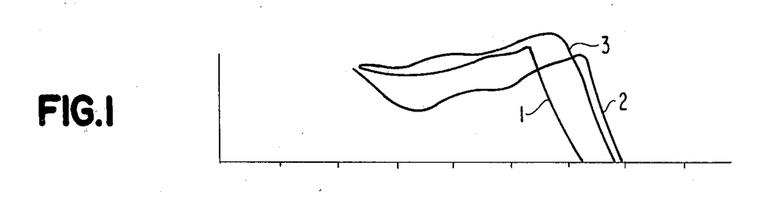
FIGS. 1-11 are characteristic curves of dyes employed as described in the Examples given hereafter.
Figure 2:
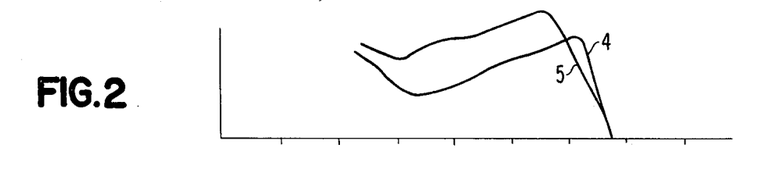
Figure 3:
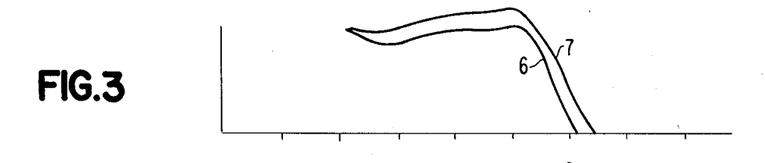
Figure 4:
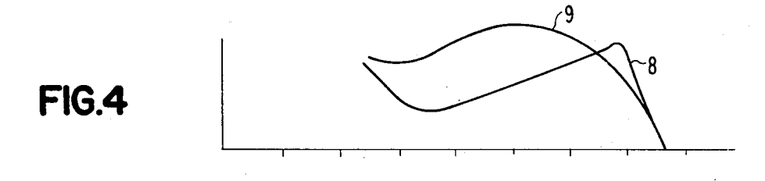
Figure 5:
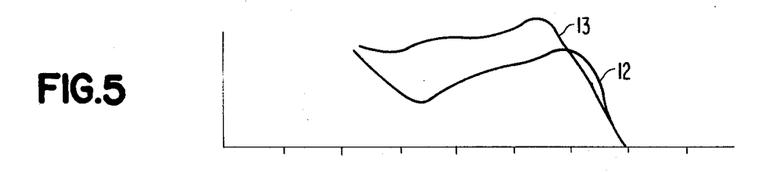
Figure 6:
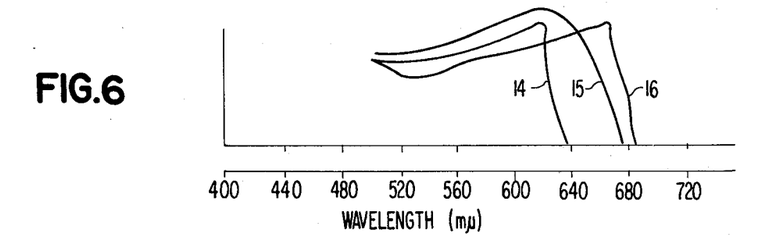
Figure 7:
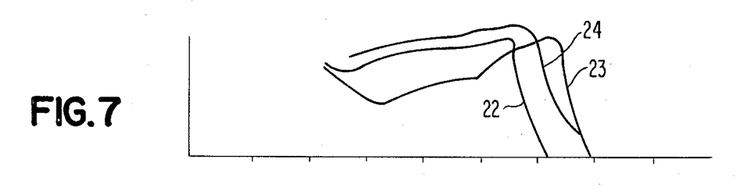
Figure 8:
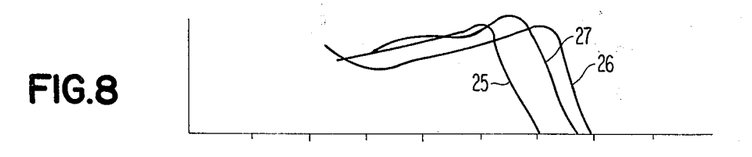
Figure 9:
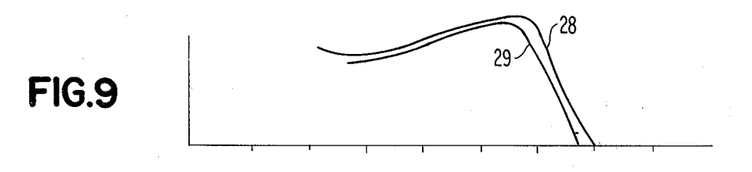
Figure 10:
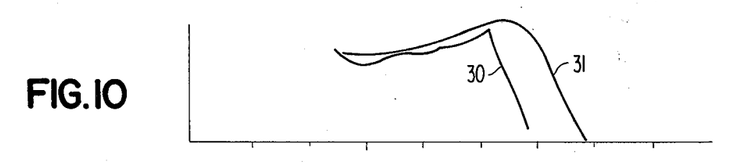
Figure 11:
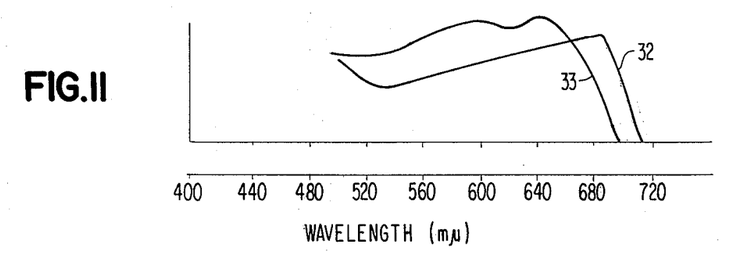

| No. | Amount of dye used/Kg emulsion ($\times 10^{-5}$mol) | | Amount of dye used/Kg emulsion ($\times 10^{-5}$mol) | | Sy (Relative value) | Sr (Relative value) | Sb (Relative value) | Fog | Spectrogram |
|---|---|---|---|---|---|---|---|---|---|
| 1 | (1A) | — | | — | * | * | 100 | 0.05 | |
| | | 2 | | — | 85 | 96 | 96 | 0.07 | |
| | | 4 | | — | 100 | 100 | 85 | 0.08 | FIG. 1 Curve 1 |
| | | — | (IIA) | 1 | 32 | 40 | 100 | 0.06 | |
| | | — | | 2 | 38 | 50 | 100 | 0.06 | FIG. 1 Curve 2 |
| | | — | | 4 | 71 | 65 | 100 | 0.08 | |
| | (1A) | 4 | (IIA) | 1 | 105 | 126 | 85 | 0.08 | |
| | | 4 | | 2 | 115 | 151 | 81 | 0.11 | FIG. 1 Curve 3 |
| | | 4 | | 4 | 100 | 112 | 76 | 0.11 | |
| 2 | | — | (IIC) | 1 | 25 | 32 | 85 | 0.06 | |
| | | — | | 2 | 32 | 79 | 85 | 0.06 | FIG. 2 Curve 4 |
| | (1A) | 4 | (IIC) | 1 | 105 | 110 | 96 | 0.09 | |
| | | 4 | | 2 | 105 | 112 | 96 | 0.10 | FIG. 2 Curve 5 |
| 3 | | — | (IIE) | 2 | 85 | 85 | 85 | 0.08 | |
| | | — | | 4 | 140 | 140 | 76 | 0.09 | FIG. 3 Curve 6 |
| | (1A) | 4 | (IIE) | 2 | 156 | 156 | 89 | 0.10 | |
| | | 4 | | 4 | 156 | 178 | 78 | 0.10 | FIG. 3 Curve 7 |
| 4 | | — | (IIF) | 1 | 43 | 40 | 86 | 0.07 | FIG. 4 Curve 8 |
| | (1A) | 4 | (IIF) | 0.5 | 100 | 118 | 94 | 0.07 | |
| | | 4 | | 1 | 100 | 126 | 94 | 0.08 | FIG. 4 Curve 9 |
| 5 | | — | (III) | 2 | 56 | 63 | 100 | 0.07 | |
| | | — | | 4 | 76 | 80 | 100 | 0.07 | FIG. 5 Curve 12 |
| | (1A) | 4 | (III) | 2 | 140 | 158 | 88 | 0.08 | FIG. 5 Curve 13 |
| | | 4 | | 4 | 158 | 178 | 85 | 0.08 | |
| 6 | (1B) | 2 | | — | 141 | 112 | 96 | 0.06 | |
| | | 4 | | — | 160 | 132 | 91 | 0.07 | FIG. 6 Curve 14 |
| | | 8 | | — | 160 | 128 | 60 | 0.07 | |
| | | — | (IIG) | 1 | 100 | 125 | 100 | 0.06 | |
| | | — | | 2 | 125 | 132 | 100 | 0.06 | FIG. 6 Curve 15 |
| | (1B) | 4 | (IIG) | 1 | 232 | 200 | 96 | 0.07 | |
| | | 4 | | 2 | 232 | 224 | 92 | 0.07 | FIG. 6 Curve 16 |
| 7 | (1G) | 2 | | — | 152 | 150 | 87 | 0.08 | |
| | | 4 | | — | 152 | 152 | 80 | 0.08 | FIG. 7 Curve 22 |
| | | — | (IIE) | 1 | 83 | 79 | 96 | 0.06 | |
| | | — | | 2 | 100 | 100 | 96 | 0.07 | FIG. 7 Curve 23 |
| | (1G) | 4 | | 1 | 234 | 200 | 96 | 0.07 | |
| | | 4 | | 2 | 234 | 224 | 93 | 0.08 | FIG. 7 Curve 24 |
| 8 | (1E) | 2 | | — | 109 | 76 | 85 | 0.08 | |
| | | 4 | | — | 110 | 96 | 76 | 0.08 | FIG. 8 Curve 25 |
| | | — | (IIB) | 1 | 66 | 62 | 100 | 0.08 | |
| | | — | | 2 | 80 | 78 | 88 | 0.09 | FIG. 8 Curve 26 |
| | (1E) | 4 | (IIB) | 1 | 100 | 142 | 50 | 0.12 | FIG. 8 Curve 27 |
| | | 4 | | 2 | 112 | 166 | 35 | 0.12 | |
| 9 | (1E) | 4 | (IIA) | 1 | 290 | 166 | 79 | 0.08 | |
| | | 4 | | 2 | 178 | 166 | 71 | 0.10 | FIG. 9 Curve 28 |
| | (1E) | 4 | (C) | 1 | 120 | 122 | 76 | 0.06 | |
| | | 4 | | 2 | 112 | 106 | 60 | 0.11 | FIG. 9 Curve 29 |
| 10 | (A) | 2 | | — | 63 | 40 | 71 | 0.06 | |
| | | 4 | | — | 71 | 51 | 65 | 0.12 | FIG. 10 Curve 30 |
| | (A) | 4 | (C) | 1 | 79 | 79 | 71 | 0.10 | |
| | | 4 | | 2 | 100 | 112 | 66 | 0.11 | FIG. 10 Curve 31 |
| 11 | | — | (IID) | 0.5 | 51 | 60 | 89 | 0.08 | |
| | | — | | 1 | 69 | 76 | 76 | 0.08 | FIG. 11 Curve 32 |
| | (1E) | 4 | (IID) | 0.5 | 178 | 152 | 71 | 0.10 | |
| | | 4 | | 1 | 178 | 152 | 70 | 0.10 | FIG. 11 Curve 33 |

*Value too low to be measured

| Composition of Liquid Developer: | |
|---|---|
| Water | 500 cc |
| Metol | 2 g |
| Anhydrous Sodium Sulfite | 90 g |
| Hydroquinone | 8 g |
| Sodium Carbonate Monohydrate | 52.5 g |
| Potassium Bromide | 5 g |
| Water (to make) | 1 liter |

The results obtained are shown as relative values in Table 1. Runs 9 and 16 were carried out for comparison.

Figure 12:
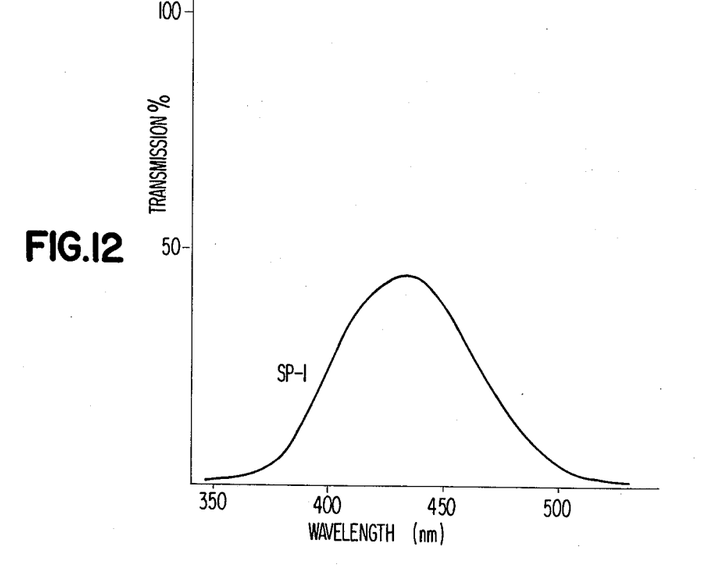
FIG. 12 is the spectral transmittance curve of an SP-1-filter and FIG. 13 shows the spectral transmittance of filters SC-50 and SC-56.
Figure 13:
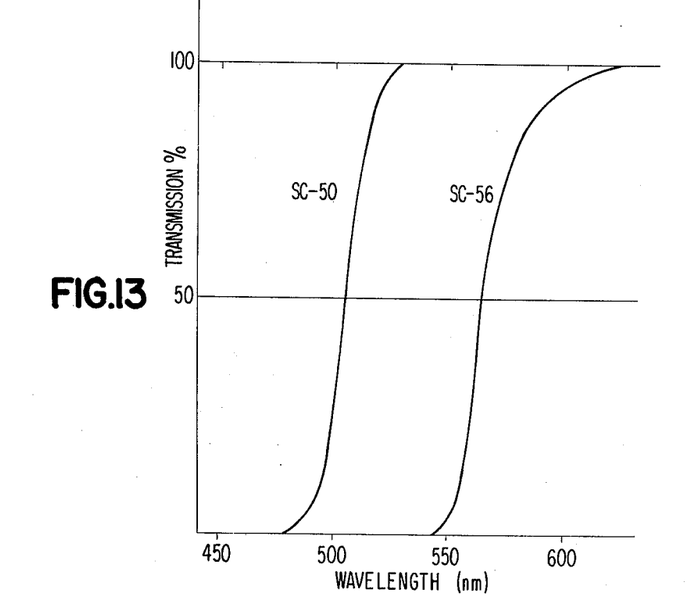

The spectral transmittance curve of the SP-1 filter is shown in FIG. 12 and those of the SC-50 and SC-56 filters in FIG. 13. The resulting spectrograms are shown in FIG. 1 – 11.

From the values in Table 1 and the spectrograms, it can be seen that the combinations of dyes having a

EXAMPLE 2

A finished emulsion was prepared as in Example 1, except that 750 g of despersion (coupler concentration 1 % by weight) containing 2-(2,4-di-t-amylphenoxypropylamido)-1-hydroxynaphthalene as a cyan coupler were added to the emulsion after adding thereto the sensitizing dyes.

The cyan coupler emulsion was prepared as follows: 50 cc of a 5% aqueous solution of sodium dodecylbenzene sulfonate were added to 1 kg of a 10 wt.% aqueous solution of gelatin. 80 g of 2-(2,4-di-t-amyphenoxypropylamido)-1-hydroxynaphthalene were dissolved in a mixture of 100 cc of tricresyl phosphate and 50 cc of ethyl acetate and 10 cc of a 20% aqueous solution of sorbitan monolaurate in methanol were added thereto. The resulting mixture was added to the 10% gelatin solution and directly emulsified at 50°C by supersonic agitation.

The resulting film was cut into strips as in Example 1 and processed through the following color development process to yield a cyan negative image.

Color Development Process:
| | | |
|---|---|---|
| Color Development | at 24°C | for 12 min. |
| Stopping Bath | " | 4 |
| Film-hardening Bath | " | 4 |
| Washing With Water | " | 4 |
| Bleaching Bath | " | 6 |
| Washing With Water | at 24°C | for 4 min. |
| Fixing Bath | " | 8 |
| Washing With Water | " | 8 |
| Drying | | |

Composition of Liquid Color Developer:
| | |
|---|---|
| Benzyl Alcohol | 5 cc |
| Caustic Soda | 0.5 g |
| Diethylene Glycol | 3 cc |
| Sodium Hexametaphosphate | 2 g |
| Sodium Sulfite | 2 g |
| Potassium Bromide | 2 g |
| 4-Amino-3-methyl-N-ethyl-β-hydroxyethylaniline Sesquisulfate Monohydrate | 5 g |
| Metaboric Acid | 0.5 g |
| Sodium Metaborate (NaBO$_2$.4H$_2$O) | 77 g |
| Water (to make) | 1 liter |

Stopping Solution:
| | |
|---|---|
| Sodium Acetate | 30 g |
| Glacial Acetic Acid | 8 cc |
| Water (to make) | 1 liter |

Film Hardening Solution:
| | |
|---|---|
| Sodium Hexametaphosphate | 1 g |
| Borax (Na$_2$B$_4$O$_7$.10H$_2$O) | 20 g |
| Formalin (37 at % aqueous solution) | 10 cc |

Bleaching Solution:
| | |
|---|---|
| Potassium Ferricyanide | 30 g |
| Potassium Bromide | 20 g |
| Borax (5H$_2$O) | 15 g |
| Boric Acid | 5 g |
| Ethylenediaminetetraacetic acid-di-sodium | 1 g |
| Water (to make) | 1 liter |

Fixing Solution:
| | |
|---|---|
| Sodium Hexametaphosphate | 1 g |
| Sodium Sulfite | 5 g |
| Sodium Thiosulfate | 150 g |
| Acetic Acid | 8 cc |
| Water (to make) | 1 liter |

Following the procedure of Example 1, the cyan image density through a red filter, the characteristic curve, the relative sensitivity Sr, Sb and fog were determined. The results are shown in Table 2.

| No. | Amount of Dye Used × 10$^{-5}$ | | Amount of Dye Used × 10$^{-5}$ | | Relative Value | | Fog |
|---|---|---|---|---|---|---|---|
| | | | | | Sr | Sb | |
| 12 | [IA] | 4 | — | | 100 | 95 | 0.14 |
| | — | | [IIA] | 4 | 60 | 100 | 0.13 |
| | [IA] | 4 | [IIA] | 4 | 200 | 85 | 0.14 |
| 13 | [IF] | 2 | — | | 92 | 96 | 0.13 |
| | | 4 | — | | 96 | 92 | 0.13 |
| | [IF] | 4 | [IIA] | 4 | 191 | 92 | 0.15 |
| 14 | (B) | 4 | [IIA] | 2 | 100 | 85 | 0.14 |
| | | 4 | | 4 | 92 | 76 | 0.14 |
| | | 4 | — | | 25 | 92 | 0.14 |

Run No. 14 was carried out for comparison. The features of this invention can be easily seen from the above results.

EXAMPLE 3

This example was conducted in accordance with the procedure set forth in Example 1 of the present application. The results obtained are shown in the Table below where $S_Y$ and $S_R$ are indicated relative to the standard value of 100 obtained using Reference Dye A (4 × 10$^{-5}$ mol) and Dye II-G (2 × 10$^{-5}$ mol) and $S_B$ is indicated relative to the standard value of 100 obtained without using dyes. Various prior art dyes were compared to establish the superiority of the dyes of the present invention wherein Ficken ('714 refers to U.S. Pat. No. 3,338,714 Ficken et al.

| Dye Abbreviation | Chemical Structure of Dye | Note |
|---|---|---|
| I-X | [structure] | Similar to Dye IB of Present Invention |
| Reference Dye A | [structure] | Dye of Ficken(714) |
| I-Y | [structure] | Similar to Dye IE of Present Invention |
| Reference Dye B | [structure] | Dye 23 of Ficken(714) |

| Run No. | Dyes and Amount of Dye Added $(\times 10^{-5}$ mol$)$ | | | | $S_Y$ | $S_R$ | $S_B$ | Fog |
|---|---|---|---|---|---|---|---|---|
| 1 | — | | — | | — | — | 100 | 0.05 |
|  | [I-X] | 4 | [II-G] | 1 | 118 | 110 | 92 | 0.06 |
|  |  | 4 |  | 2 | 132 | 142 | 80 | 0.07 |
|  |  | 4 |  | 4 | 153 | 200 | 72 | 0.08 |
| 2 | Reference Dye A | 4 | [II-G] | 1 | 92 | 72 | 82 | 0.06 |
|  |  | 4 |  | 2 | 100 | 100 | 73 | 0.07 |
|  |  | 4 |  | 4 | 118 | 142 | 56 | 0.08 |
| 3 | [I-Y] | 4 | [II-K] | 1 | 110 | 106 | 89 | 0.07 |
|  |  | 4 |  | 2 | 110 | 114 | 78 | 0.09 |
|  |  | 4 |  | 4 | 118 | 160 | 67 | 0.09 |
| 4 | Reference Dye B | 4 | [II-K] | 1 | 92 | 89 | 89 | 0.07 |
|  |  | 4 |  | 2 | 95 | 92 | 75 | 0.09 |
|  |  | 4 |  | 4 | 98 | 118 | 63 | 0.09 |
| 5 | [I-Z] | 4 | [II-J] | 1 | 123 | 100 | 92 | 0.06 |
|  |  | 4 |  | 2 | 130 | 127 | 81 | 0.07 |
|  |  | 4 |  | 4 | 160 | 180 | 67 | 0.08 |
| 6 | Reference Dye C | 4 | [II-J] | 1 | 95 | 89 | 92 | 0.06 |
|  |  | 4 |  | 2 | 102 | 106 | 84 | 0.07 |
|  |  | 4 |  | 4 | 114 | 125 | 67 | 0.08 |

These results clearly demonstrate the unexpected results obtained with the specific combination of Dye I and Dye II of the invention as now defined.

EXAMPLE 4

This Example represents a comparison of color staining levels between the dye combination of the present invention and the dye combination of U.S. Pat. No. 3,679,428 Shiba et al. (Shiba et al).

The procedure of Example 1 was followed except for using the dyes set forth below and for determining color stain density through a red filter:

Comparative Experimental Data Showing a Difference in Color Stain Levels Density of Color Stain when $8\times10^{-5}$ mol/silver mol was added (IA)

-continued

Comparative Experimental Data Showing a Difference in Color Stain Levels

| Structure | Density of Color Stain when $8\times10^{-5}$ mol/silver mol was added |
|---|---|
|  (Comparison) | 0.01 |
|  | 0.06 |

The dye combination of the present invention is seen to provide unexpectedly lower color staining.

The combinations of sensitizing dyes having a supersensitization effect according to this invention are useful for the spectral sensitization of silver halide emulsions in the red sensitive layer of color sensitive material such as color negative and reversal sensitive materials, the spectral sensitization of silver halide emulsions used for black-and-white sensitive materials, the spectral sensitization of silver halides used as a printing plate sensitive material and the spectral sensitization of silver halide emulsions used for sensitive materials as are used in microsecond exposure, above all a cathode ray tube sensitive material and a sensitive material for holography as well as a sensitive material used in facsimile systems.

When the combination is used for a color sensitive material, it is preferred to provide a magenta or red external filter on the upper portion of or adjacent to the red sensitive silver halide emulsion layer obtained according to this invention in order to render practically the green sensitivity less than the red sensitivity obtained by this invention. For the formation of such filter layer, dyes are used are described in Japanese Patent Publication Nos. 18459/66, 3504/68, 13168/68 and 22069/64; Japanese Patent Application Nos. 98474/71, 42668/71 and 42667/71; and U.S. Pat. Nos. 3,440,051, 3,468,883, 3,294,539, 3,379,533, 3,352,680, 3,379,533, 3,389,994, 3,384,487, 3,423,207, 3,493,375, 3,486,897, 3,481,927, 3,497,502, 3,573,289, 3,560,214, 3,615,432 and 3,282,699; British Patent No. 506,385 etc. Especially, dyes which absorb selectively the short wave region less than 570 nm are useful. The methods are used, which are described in the German Laid-Open Specification No. 2,008,882; U.S. Pat. Nos. 3,425,834, and 3,282,699; Belgian Patent Nos. 682,413, 685,292, 703,939 and 627,308; Japanese Patent Publication Nos. 21766/68, 13498/68, 15896/60 and 10254/68 etc. These may be used for the prevention of irradiation and halation.

Particularly preferred embodiments according to this invention are as follows:

1. A compound of the formula (I) wherein the heterocyclic ring formed by the group $Z_1$ is the $\beta$-naphthothiazole ring, the heterocyclic ring formed by the group $Z_2$ is a benzoxazole ring, which is substituted at the 5-position by a chlorine atom, a trifluoromethyl, methyl or phenyl radical and $A_1$ is an ethyl radical.

2. A compound of the formula (II) wherein $A_2$ is a methyl or ethyl radical, $R_3$ and $R_4$ each is a methyl, ethyl, propyl, allyl, carboxyalkyl or sulfoalkyl radical.

3. a color sensitive material comprising an emulsion containing a cyan coupler, characterized by containing in a supersensitizing amount the combination of at least one carbocyanine dye represented by general formula (I) and at least one dye represented by general formula (II).

While the invention has been described in detail and with reference to specific embodiments thereof, it will be apparent to one skilled in the art that various changes and modifications can be made therein without departing from the spirit and scope thereof.

What is claimed is:

1. A silver halide photograhic emulsion which is spectrally sensitized so that it has a maximum sensitivity wave length within the region of 580 – 640 nm, characterized by containing in a supersensitizing amount the combination of:
   at least one carbocyanine dye represented by the general formula (I) and at least one dye represented by the general formula (II)

wherein $Z_1$ represents the grouping necessary for the formation of $\beta$-naphthothiazole or $\beta$-naphthoselenazole ring, $Z_2$ represents the grouping necessary for the formation of benzoxazole ring, $A_1$ represents a hydrogen atom, an alkyl radical, or an aryl radical, $R_1$ represents an alkyl radical and $R_2$ represents a hydroxyalkyl radical, a carboxyalkyl radical or an alkyl radical having a sulfo group, $X_1$ represents an acid anion group, and $l$ is 1 or 2, the dye forming an intramolecular salt when $l$ is 1:

wherein $Z_3$ and $Z_4$ each represents the grouping necessary for the formation of a benzothiazole, benzoselenazole, β-naphthothiazole or β-naphthoselenazole ring, $A_2$ represents a hydrogen atom, an alkyl radical having less than three carbon atoms or an aryl radical, $R_3$ and $R_4$ each represents an alkyl radical, at least one of which represents a hydroxyalkyl radical, a carboxyalkyl radical or an alkyl radical having a sulfo group, $X_2$ represents an acid anion group, and $m$ is 1 or 2, the dye forming an intramolecular salt when $m$ is 1.

2. The silver halide photographic emulsion of claim 1, wherein the hetero ring formed by $Z_2$, $Z_3$ and $Z_4$ is substituted with at least one substituent, said substituent being selected from the group consisting of an alkyl group, a halogen atom, a monoaryl group, an alkoxy group, a hydroxy group, an alkoxy carbonyl group, a cyano group, an amino group, an aminocarbonyl group, a monoaryloxy group and an acyl group.

3. The silver halide photographic emulsion of claim 1, wherein $Z_2$ is a benzoxazole, 5-methyl benzoxazole, 5,6-dimethyl benzoxazole, 5-chlorobenzoxazole, 5-chloro-6-methyl benzoxazole, 5-bromobenzoxazole, 5-phenyl benzoxazole, 5-tolyl benzoxazole, 5-methoxy benzoxazole, 5-hydroxy benzoxazole, 5-methoxycarbonyl benzoxazole, 5-ethoxycarbonyl benzoxazole, 5-trifluoromethyl benzoxazole, 5-cyanobenzoxazole, 5-aminobenzoxazole, 5-phenoxybenzoxazole, or 5-acetyl benzoxazole ring; wherein $A_1$ and $A_2$ each is a hydrogen atom, a methyl, ethyl, propyl, phenethyl or phenyl radical; wherein $R_1$, $R_3$ and $R_4$ each is a methyl, ethyl, propyl, allyl, 2-carboxyethyl, 4-carboxybutyl, 3-carboxypropyl, 2-methoxyethyl, 3-sulfopropyl, 3-sulfobutyl, 2-(3-sulfopropoxy)ethyl, 2-hydroxy-3-sulfopropyl, 3-sulfopropoxyethoxyethyl, 2-bromoethyl, or p-sulfophenethyl group; wherein $Z_3$ and $Z_4$ each is a benzothiazole, 5-chlorobenzothiazole, 5-fluorobenzothiazole 5-bromo-6-methyl benzothiazole, 5-cyanobenzothiazole, 5-cyano-6-chlorobenzothiazole, 5-methyl benzothiazole, 7-dimethylaminobenzothiazole, 5-phenyl benzothiazole, 5-p-methoxyphenyl benzothiazole 5-phenoxy benzothiazole, 5-trifluoromethylbenzothiazole, 5-dimethylaminocarbonylbenzothiazole, 5 methoxycarbonyl benzothiazole, 5-hydroxy benzothiazole, benzoselenazole, 5-methyl benzoselenazole, β naphthothiazole or β-naphthoselenazole ring; and $X$ and $X_2$ each represents an iodine, bromine, chlorine p-toluene sulfonic acid, benzene sulfonic acid, ethyl sulfate, perchlorate, or rhodan ions.

4. The silver halide photographic emulsion of claim 1, wherein said dye of the general formula (I) is

( I A )

( I B )

( I D )

(I E)

(I F)

(I G) and wherein said dye of the general formula (II) is

(II A)

(II B)

(II C)

(II D)

(II E)

(II F)

(II G)

(II H)

and (II I)

5. The silver halide photographic emulsion of claim 1, wherein said dyes of the general formula (I) and (II) are present at a level of from about $5 \times 10^{-3}$ to $1 \times 10^{-6}$ mol of dye per mol of silver and wherein the molar ratio of the amount of dye of the general formula (II) to the amount of dye of the general formula (I) is about 1:100 to 1:1.

6. The silver halide photographic emulsion of claim 1, wherein $Z_1$ is a $\beta$-naphthothiazole ring, $Z_2$ is a benzoxazole ring which is substituted at the 5-position with a chlorine atom, a trifluoromethyl group, a methyl group or a phenyl group and $A_1$ is an ethyl group.

7. The silver halide photographic emulsion of claim 1, wherein $A_2$ is a methyl group or an ethyl group, wherein $R_3$ and $R_4$ each is a methyl group, an ethyl group, a propyl group, an allyl group, a carboxyalkyl group or a sulfoalkyl group.

8. The silver halide photographic emulsion of claim 1, wherein said emulsion additionally contains a cyan coupler of the phenol series or naphthol series.

9. A silver halide photograhic material comprising a support having thereon the silver halide emulsion of claim 1.

* * * * *